United States Patent
Meyer Timmerman Thijssen et al.

(10) Patent No.: US 11,892,676 B2
(45) Date of Patent: Feb. 6, 2024

(54) SELF-ALIGNED FORMATION OF ANGLED OPTICAL DEVICE STRUCTURES

(71) Applicant: Applied Materials, Inc., Santa Clara, CA (US)

(72) Inventors: Rutger Meyer Timmerman Thijssen, Sunnyvale, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 81 days.

(21) Appl. No.: 17/647,535

(22) Filed: Jan. 10, 2022

(65) Prior Publication Data

US 2023/0221484 A1  Jul. 13, 2023

(51) Int. Cl.
*G02B 5/18* (2006.01)
*F21V 8/00* (2006.01)
*B29D 11/00* (2006.01)

(52) U.S. Cl.
CPC ...... *G02B 6/0065* (2013.01); *B29D 11/00317* (2013.01); *G02B 5/1857* (2013.01)

(58) Field of Classification Search
None
See application file for complete search history.

(56) References Cited

U.S. PATENT DOCUMENTS

| | | | |
|---|---|---|---|
| 10,983,257 B1 | 4/2021 | Colburn et al. | |
| 11,249,230 B2* | 2/2022 | Mohanty | G02B 6/0016 |
| 2018/0348429 A1* | 12/2018 | Young | G02B 6/1223 |
| 2020/0004029 A1 | 1/2020 | Godet et al. | |
| 2020/0135542 A1 | 4/2020 | Felix et al. | |
| 2020/0192031 A1* | 6/2020 | Evans | G03F 7/0005 |
| 2021/0180183 A1* | 6/2021 | Guo | C23C 16/045 |

FOREIGN PATENT DOCUMENTS

| | | |
|---|---|---|
| JP | H096807 A | 4/1998 |
| KR | 1020210021397 A | 2/2021 |

OTHER PUBLICATIONS

International Search Report/ Written Opinion issued to PCT/US2022/082405 dated May 4, 2023.

* cited by examiner

*Primary Examiner* — Shamim Ahmed
(74) *Attorney, Agent, or Firm* — Patterson + Sheridan, LLP (57) ABSTRACT

Embodiments described herein provide for methods of forming angled optical device structures. The methods described herein utilize etching a mandrel material with an etch chemistry that is selective to the hardmask, i.e., the mandrel material is etched at a higher rate than the hardmask. Therefore, mandrel trenches are formed in the mandrel material. Device material of the angled optical device structures to be formed is deposited on the plurality of angled mandrels. An angled etch process is performed on portions of the device material such that the angled optical device structures are formed.

20 Claims, 6 Drawing Sheets

SELF-ALIGNED FORMATION OF ANGLED OPTICAL DEVICE STRUCTURES

BACKGROUND

Field

Embodiments of the present disclosure generally relate to optical devices for augmented, virtual, and mixed reality. More specifically, embodiments described herein provide for angled optical device structures and a method of forming angled optical device structures.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment. Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are challenges and design constraints with augmented reality.

One such challenge is displaying a virtual image overlaid on an ambient environment. Optical devices including waveguide combiners, such as augmented reality waveguide combiners, and flat optical devices, such as metasurfaces, are used to assist in overlaying images. Generated light is propagated through optical device structures of the optical device until the light exits the optical device and is overlaid on the ambient environment. However, forming the optical device structures can be time consuming and include costly patterning processes. Accordingly, what is needed in the art are improved methods of forming optical device structures.

SUMMARY

In one embodiment, a method is provided. The method includes disposing a hardmask layer on a mandrel material and the mandrel material is disposed on a substrate. The method further includes patterning the hardmask layer into a plurality of hardmask structures. The hardmask structures define exposed portions of the mandrel material. The method further includes etching the exposed portions of the mandrel material at a first etch angle to form a plurality of angled mandrels having a device angle and removing the hardmask structures. The method further includes depositing a device material on the substrate and on a mandrel upper surface, a leading sidewall, and a trailing sidewall of each of the plurality of angled mandrels and removing the device material disposed on the substrate and the mandrel upper surface of the plurality of angled mandrels with an angled etch process at a second etch angle to form a plurality of angled optical device structures having the device angle.

In another embodiment, a method is provided. The method includes disposing a hardmask layer on a mandrel material and the mandrel material is disposed on a substrate. The method further includes patterning the hardmask layer into a plurality of hardmask structures. The hardmask structures define exposed portions of the mandrel material. The method further includes etching the exposed portions of the mandrel material at a first etch angle to form a plurality of angled mandrels having a device angle and removing the hardmask structures. The method further includes depositing a device material on the substrate and on a mandrel upper surface, a leading sidewall, and a trailing sidewall of each of the plurality of angled mandrels. The method further includes removing the device material disposed on the substrate and the upper surface of the plurality of angled mandrels with an angled etch process at a second etch angle to form a plurality of angled optical device structures having the device angle and removing the plurality of angled mandrels between the plurality of angled optical device structures.

In yet another embodiment, a method is provided. The method includes disposing a hardmask layer on a mandrel material and the mandrel material is disposed on a substrate. The method further includes patterning the hardmask layer into a plurality of hardmask structures. The hardmask structures define exposed portions of the mandrel material. The plurality of hardmask structures include a patterned pitch between adjacent hardmask structures. The patterned pitch is from about 200 nm to about 2000 nm. The plurality of hardmask structures further include a hardmask structure critical dimension from about 50 nm to about 500 nm. The method further includes etching the exposed portions of the mandrel material to form a plurality of angled mandrels at a device angle and removing the hardmask structures. The method further includes depositing a device material on the substrate and on a mandrel upper surface, a leading sidewall, and a trailing sidewall of each of the plurality of angled mandrels. The method further includes removing the device material disposed on the substrate and the upper surface of the plurality of angled mandrels with an angled etch process at an etch angle to form a plurality of angled optical device structures at the device angle and removing the plurality of angled mandrels between the plurality of angled optical device structures.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices for augmented, virtual, and mixed reality. More specifically, embodiments described herein provide for methods of forming angled optical device structures. The methods described herein utilize etching a mandrel material with an etch chemistry that is selective to a patterned hardmask, e.g., the mandrel material is etched at a higher rate than the patterned hardmask. Therefore, angled mandrels are formed in the mandrel material such that device material of the angled optical device structures to be formed is deposited on the plurality of angled mandrels. The device material is etched at an etch angle such that a plurality of angled optical device structures remain.

Figure 1A:
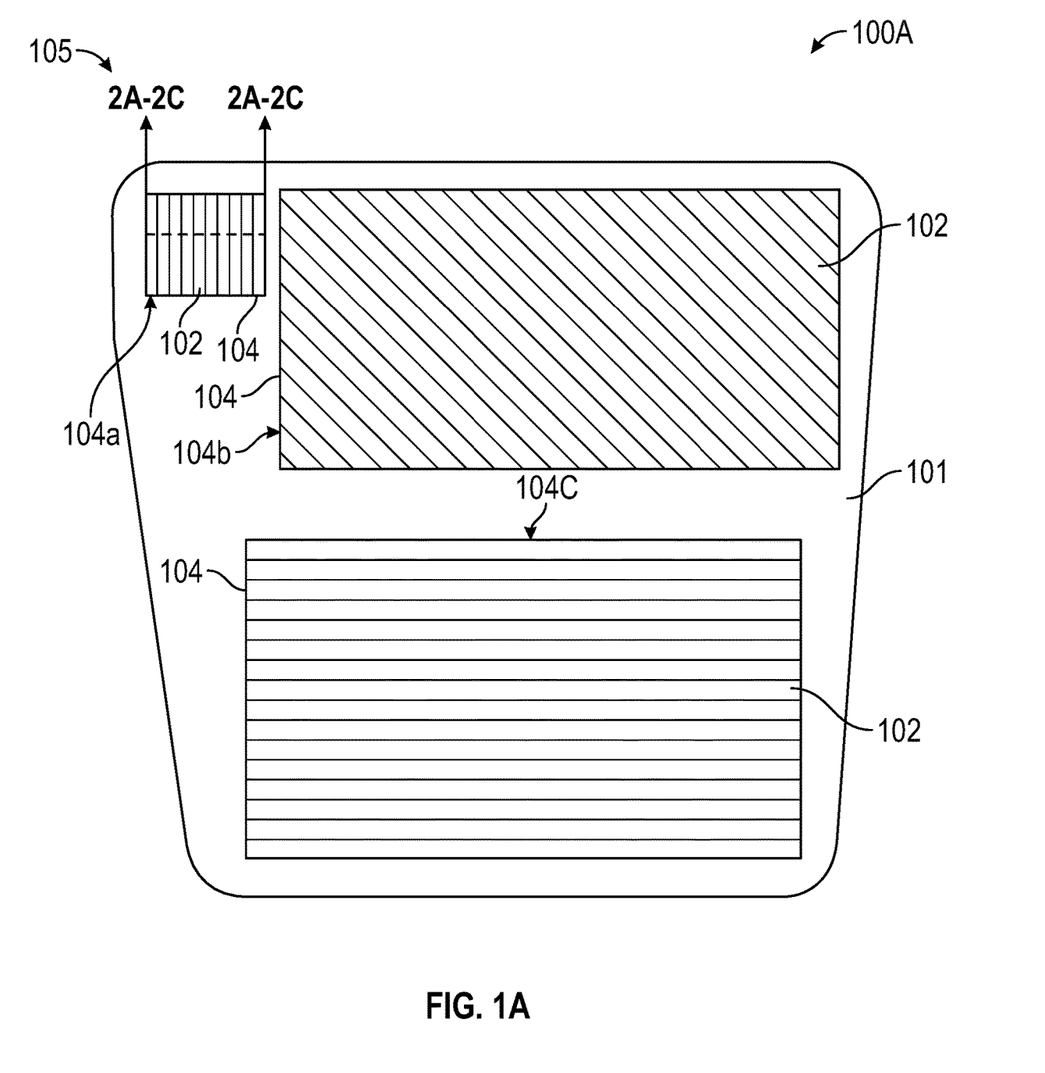
FIG. 1A is a perspective, frontal view of an optical device according to embodiments described herein.
Figure 1B:
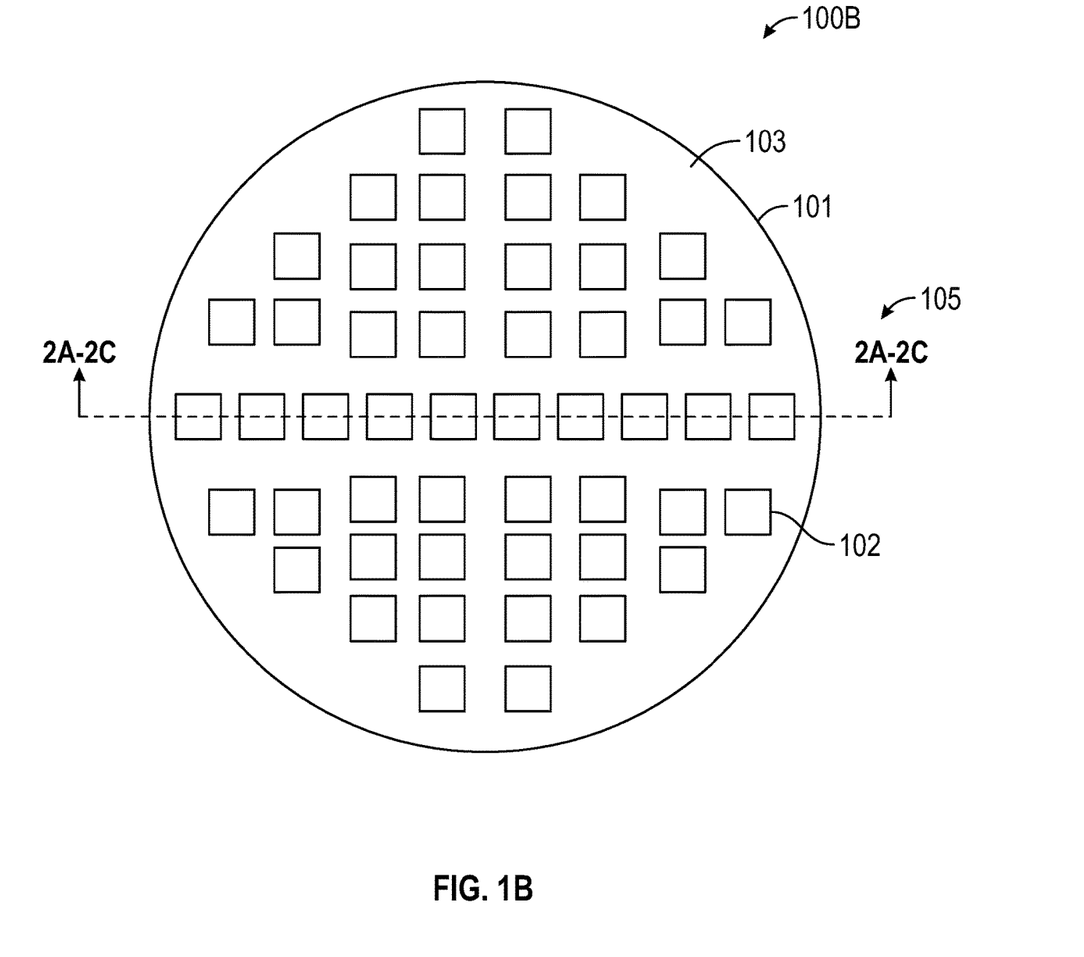
FIG. 1B is schematic, top view of an optical device according to embodiments described herein.

FIG. 1A is a perspective, frontal view of an optical device 100A. FIG. 1B is a schematic, top view of an optical device 100B. It is to be understood that the optical devices 100A and 100B described below are exemplary optical devices. In one embodiment, which can be combined with other embodiments described herein, the optical device 100A is a waveguide combiner, such as an augmented reality waveguide combiner. In another embodiment, which can be combined with other embodiments described herein, the optical device 100B is a flat optical device, such as a metasurface. The optical devices 100A and 100B include a plurality of angled optical device structures 102 disposed on a surface 103 of a substrate 101. The angled optical device structures 102 may be nanostructures having sub-micron dimensions, e.g., nano-sized dimensions. A portion 105 of the plurality of angled optical device structures 102 are shown in FIGS. 1A and 1B.

In one embodiment, which can be combined with other embodiments described herein, regions of the angled optical device structures 102 correspond to one or more gratings 104, such as a first grating 104a, a second grating 104b, and a third grating 104c. In one embodiment, which can combined with other embodiments described herein, the optical devices 100A is a waveguide combiner that includes at least the first grating 104a corresponding to an input coupling grating and the third grating 104c corresponding to an output coupling grating. The waveguide combiner according to the embodiment, which can be combined with other embodiments described herein, includes the second grating 104b corresponding to an intermediate grating. While FIGS. 1A and 1B depict the angled optical device structures 102 as having square or rectangular shaped cross-sections, the cross-sections of the angled optical device structures 102 may have other shapes including, but not limited to, circular, triangular, elliptical, regular polygonal, irregular polygonal, and/or irregular shaped cross-sections. In some embodiments, which can be combined with other embodiments described herein, the cross-sections of the angled optical device structures 102 on a single optical device 100A or 100B are different.

The substrate 101 may be formed from any suitable material, provided that the substrate 101 can adequately transmit light in a desired wavelength or wavelength range. Substrate selection may include substrates 101 of any suitable material, including, but not limited to, silicon (Si), silicon dioxide ($SiO_2$), doped $SiO_2$, fused silica, quartz, silicon carbide (SiC), germanium (Ge), silicon germanium (SiGe), indium phosphide (InP), gallium arsenide (GaAs), gallium nitride (GaN), diamond, or sapphire containing materials.

Figure 2A:
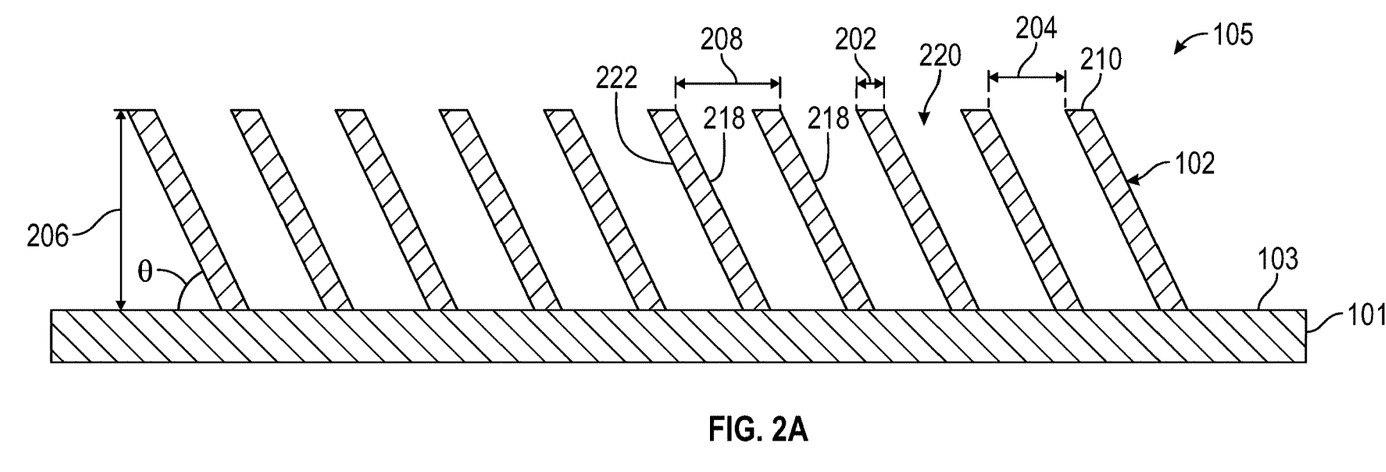
FIGS. 2A and 2B are schematic, cross-sectional views of a portion of an optical device with a plurality of angled optical device structures according to embodiments described herein.
Figure 2B:
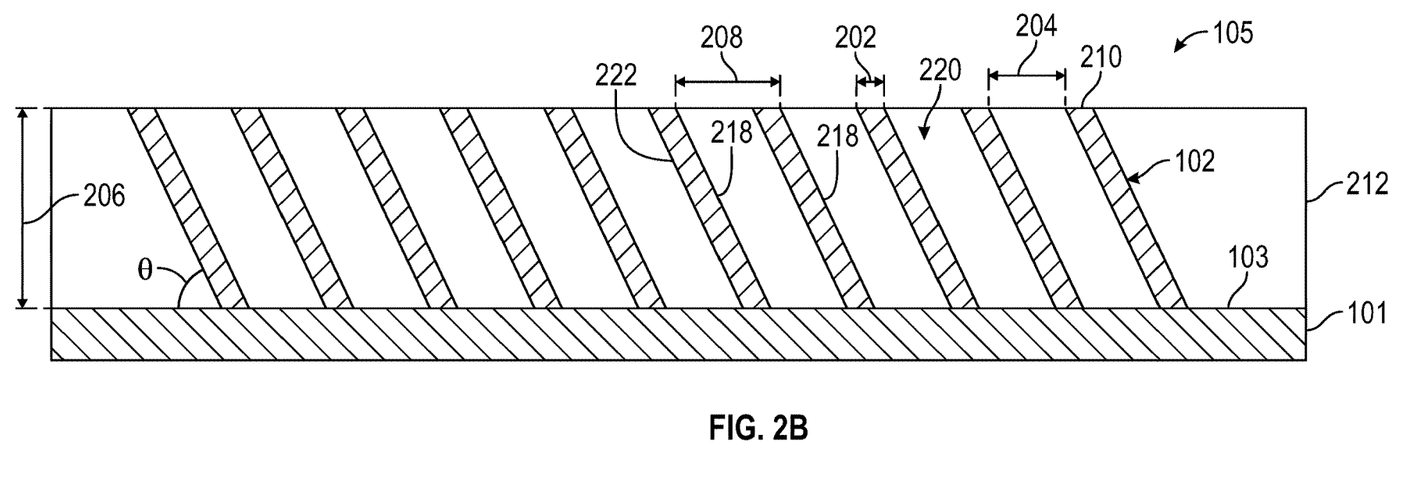

FIGS. 2A and 2B are schematic, cross-sectional views of a portion 105 of an optical device 100A or 100B with a plurality of angled optical device structures 102. FIGS. 2A and 2B are a portion 105 of the optical device 100A or the optical device 100B, as shown in FIGS. 1A and 1B. Although FIG. 1A shows the portion 105 corresponding to the first grating 104a, the portion 105 is not limited to the first grating 104a and may correspond to any of the first grating 104a, the second grating 104b, or the third grating 104c.

FIG. 2B depicts the portion 105 of the optical device 100A or 100B with a gap-fill material 212 disposed over the plurality of angled optical device structures 102. It is contemplated that the gap-fill material 212 may be included in the portion 105 for any of the embodiments of the plurality of angled optical device structures 102 described herein.

The portion 105 of the optical devices 100A and 100B include the plurality of angled optical device structures 102 disposed on a surface 103 of a substrate 101. Each of the angled optical device structures 102 includes an upper surface 210. The plurality of angled device structures 102 define a plurality of gaps 220. Each gap of the plurality of gaps 220 is defined between adjacent angled optical device structures 102.

Each angled optical device structure of the plurality of angled optical device structures 102 has a critical dimension 202. In one embodiment, which may be combined with other embodiments described herein, the critical dimension 202 is less than 1 micrometer (μm) and corresponds to the width or the diameter of each angled optical device structure 102, depending on the cross-section of the angled optical device structure 102. In one embodiment, which can be combined with other embodiments described herein, at least one critical dimension 202 may be different from another critical dimension 202. In another embodiment, which can be combined with other embodiments described herein, each critical dimension 202 of the plurality of angled optical device structures 102 is substantially equal to each other critical dimension 202, as shown in FIGS. 2A and 2B. The critical dimension 202 is from about 10 nm to about 300 nm. Adjusting the critical dimension provides for adjustment of the efficiency of the optical devices 100A and 100B.

Each pair of adjacent angled optical device structures 102 has a spacewidth 204. The spacewidth 204 is defined as the distance between adjacent angled optical device structures 102. As shown in FIGS. 2A and 2B, the spacewidth 204 between each adjacent angled optical device structure 102 is substantially equal. In other embodiments, which can be combined with other embodiments described herein, at least one spacewidth 204 of adjacent angled optical device structures 102 is different from the spacewidth 204 of other adjacent angled optical device structures 102 of the portion 105. The spacewidth 204 is between about 150 nm and about 1500 nm.

Each angled optical device structure 102 of the plurality of angled optical device structures 102 has a height 206. The height 206 is defined as the distance from the upper surface 210 of the plurality of angled optical device structures 102 to the surface 103 of the substrate 101. In one embodiment, which can be combined with other embodiments described herein, at least one height 206 of the plurality of angled optical device structures 102 is different that the height 206 of the other angled optical device structures 102. In another embodiment, which can be combined with other embodiments described herein, each height 206 of the plurality of angled optical device structures 102 is substantially equal, as shown in FIGS. 2A and 2B.

Each adjacent angled optical device structure 102 has a pitch 208. The pitch 208 is defined as the distance between a first edge 218 of adjacent angled optical device structures 102. As shown in FIGS. 2A and 2B, the pitch 208 of one or more adjacent angled optical device structures 102 is substantially equal to the pitch 208 of other surrounding angled optical device structures 102. In other embodiments, which can be combined with other embodiments described herein, the pitch 208 of one or more adjacent angled optical device structure 102 is different from the pitch 208 of surrounding angled optical device structures 102. The pitch 208 is from about 100 nm to about 100 nm.

The angled optical device structures 102 are formed at a device angle ϑ. The device angle ϑ is the angle between the surface 103 of the substrate 101 and a second edge 222 of the angled optical device structure 102. In one embodiment, which can be combined with other embodiments described herein, each respective device angle ϑ for each angled optical device structure 102 is substantially equal throughout the portion 105, as shown in FIGS. 2A and 2B. In another embodiment, which can be combined with other embodiments described herein, at least one respective device angle ϑ of the plurality of angled optical device structures 102 is different than another device angle ϑ of the plurality of angled optical device structures 102. The device angle ϑ is about 0 degrees to about 75 degrees. For example, the device angle ϑ is about 15 degrees to about 65 degrees.

The plurality of angled optical device structures 102 are formed from a device material. In some embodiments, which can be combined with other embodiments described herein, the device material may have a device material refractive index between about 1.5 and about 2.65. In other embodiments, which can be combined with other embodiments described herein, the device material may have a refractive index between about 2.65 and about 4.0. The device material is chosen to improve the optical properties of the optical device 100A or 100B to be formed. For example, the device material is chosen based on the device material refractive index. In some embodiments, which can be combined with other embodiments described herein, the device material includes, but is not limited to, one or more of silicon oxycarbide (SiOC), silicon carbide (SiC), titanium dioxide (TiO$_2$), silicon dioxide (SiO$_2$), vanadium (IV) oxide (VOx), aluminum oxide (Al$_2$O$_3$), aluminum-doped zinc oxide (AZO), indium tin oxide (ITO), tin dioxide (SnO$_2$), zinc oxide (ZnO), tantalum pentoxide (Ta$_2$O$_5$), silicon nitride (Si$_3$N$_4$), zirconium dioxide (ZrO$_2$), niobium oxide (Nb$_2$O$_5$), cadmium stannate (Cd$_2$SnO$_4$), silicon carbon-nitride (SiCN) containing materials, or combinations thereof.

As shown in FIG. 2B, a gap-fill material 212 is deposited over the plurality of angled optical device structures 102. The gap-fill material 212 is deposited over the plurality of angled optical device structures 102. The gap-fill material 212 is a conformal material. In one embodiment, the gap-fill material 212 is disposed over the plurality of angled optical device structures 102. In another embodiment, the gap-fill material 212 is only disposed in the plurality of gaps 220 such that the gap-fill material does not contact the upper surface 210.

The gap-fill material 212 may be chosen based on refractive index such that the refractive index contrast between the gap-fill material 212 and the device material increases. The gap-fill material 212 includes, but is not limited to, silicon oxycarbide (SiOC), titanium dioxide (TiO$_2$), silicon dioxide (SiO$_2$), vanadium (IV) oxide (VOX), aluminum oxide (Al$_2$O$_3$), indium tin oxide (ITO), zinc oxide (ZnO), tantalum pentoxide (Ta$_2$O$_5$), silicon nitride (Si$_3$N$_4$), titanium nitride (TiN), zirconium dioxide (ZrO$_2$), silicon carbon-nitride (SiCN) containing materials, organic polymer materials, fluoride based materials, or combinations thereof. In one embodiment, which can be combined with other embodiments described herein, the device material includes a refractive index greater than the gap-fill material 212. In another embodiment, which can be combined with other embodiments described herein, the device material includes a refractive index less than the gap-fill material 212.

In one embodiment, which can be combined with other embodiments described herein, the gap-fill material 212 can be deposited in each gap 220 of the portion 105. In one embodiment, which can be combined with other embodiments described herein, the same gap-fill material 212 can be deposited into each gap 220. In another embodiment, which can be combined with other embodiments described herein, the gap-fill material 212 disposed in each gap 220 is a different gap-fill material 212. For example, two or more gap-fill materials 212 may be utilized in each of the gaps 220.

Figure 3:
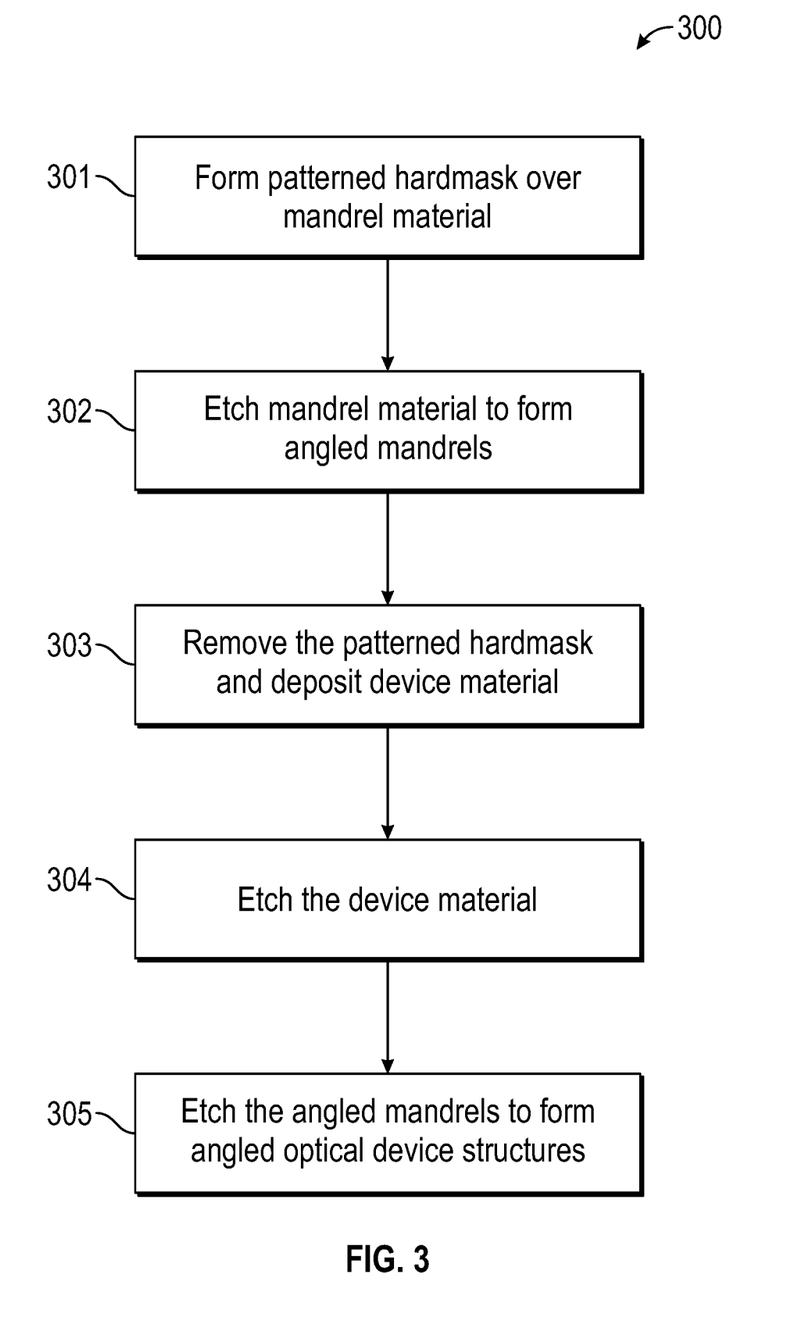
FIG. 3 is a flow diagram of a method for forming a plurality of angled optical device structures of an optical device according to embodiments described herein.

FIG. 3 is a flow diagram of a method 300 for forming a plurality of angled optical device structures 102 of an optical device 100A and 100B as shown in FIGS. 4A-4F. FIGS. 4A-4F are schematic, cross-sectional views of a portion 105 of an optical device 100A or 100B during a method 300 for forming a plurality of angled optical device structures 102. In one embodiment, which can be combined with other embodiments described herein, the portion 105 may correspond to a portion or a whole surface of the substrate 101 of a waveguide combiner, as shown in FIG. 1A. In another embodiment, which can be combined with other embodiments described herein, the portion 105 may correspond to a portion or a whole surface of the substrate 101 of a flat optical device, as shown in FIG. 1B. The portion 105 may correspond to one or more gratings 104. In one embodiment, the portion 105 corresponds to the first grating 104a, the second grating 104b, and/or the third grating 104c of the optical device 100A and 100B.

Figure 4A:
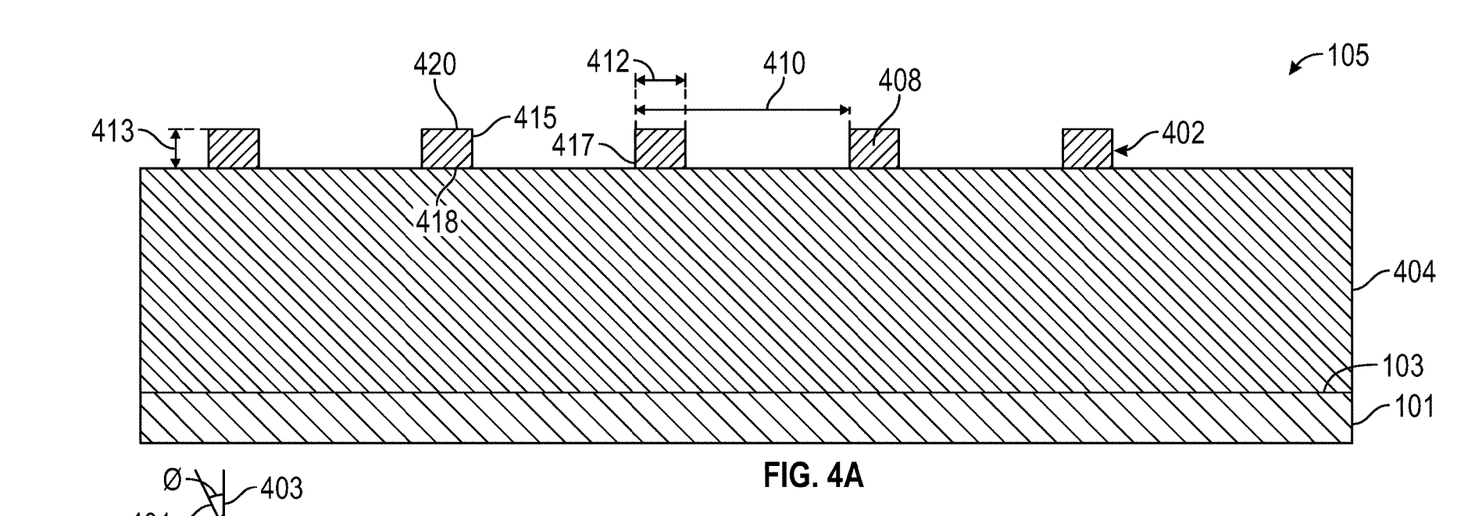
FIGS. 4A-4D are schematic, cross-sectional views of a portion of an optical device during a method for forming a plurality of angled optical device structures according to embodiments described herein.

At operation 301, as shown in FIG. 4A, a patterned hardmask 402 is formed. The patterned hardmask 402 is formed over a mandrel material 404. The mandrel material 404 is disposed on a surface 103 of a substrate 101. The patterned hardmask 402 includes a plurality of hardmask structures 408. Adjacent hardmask structures 408 expose portions of the mandrel material 404. The mandrel material 404 may be chosen based on etch performance of the mandrel material 404, as the mandrel material 404 will not always remain on the final optical device 100A or 100B. Therefore, the optical properties of the mandrel material 404 are not critical relative to the etch performance of the mandrel material 404. The mandrel material 404 includes, but is not limited to, silicon oxycarbide (SiOC), titanium dioxide (TiO$_2$), silicon dioxide (SiO$_2$), vanadium (IV) oxide (VOX), aluminum oxide (Al$_2$O$_3$), indium tin oxide (ITO), zinc oxide (ZnO), tantalum pentoxide (Ta$_2$O$_5$), silicon nitride (Si$_3$N$_4$), titanium nitride (TiN), zirconium dioxide (ZrO$_2$), silicon carbon-nitride (SiCN) containing materials, or combinations thereof. The patterned hardmask 402 is formed by disposing a hardmask layer over the mandrel material 404 and subsequently patterning the hardmask layer. The patterned hardmask 402 includes, but is not limited to, silicon nitride (SiN), silicon oxide (SiO), silicon oxycarbide (SiOC), SiCONH, tantalum oxide (TaO), borophosphosilicate glass (BPSG), phosphosilicate glass (PSG), dielectric, or metallic alloy containing materials.

Each hardmask structure 408 includes a leading edge 415 at a top surface 420 of hardmask structure 408. Each hardmask structure 408 has a trailing edge 417 at a bottom surface 418 contacting the mandrel material 404. The patterned hardmask 402 includes a patterned pitch 410 between adjacent trailing edges 417. The patterned pitch 410 is between about 200 nm and about 2000 nm. Each hardmask structure 408 has a hardmask thickness 413 from the bottom surface 418 to the top surface 420. The hardmask thickness 413 is constant across the portion 105. Each hardmask structure 408 has a hardmask structure critical dimension 412. The hardmask structure critical dimension 412 is from about 50 nm to about 400 nm.

Figure 4B:
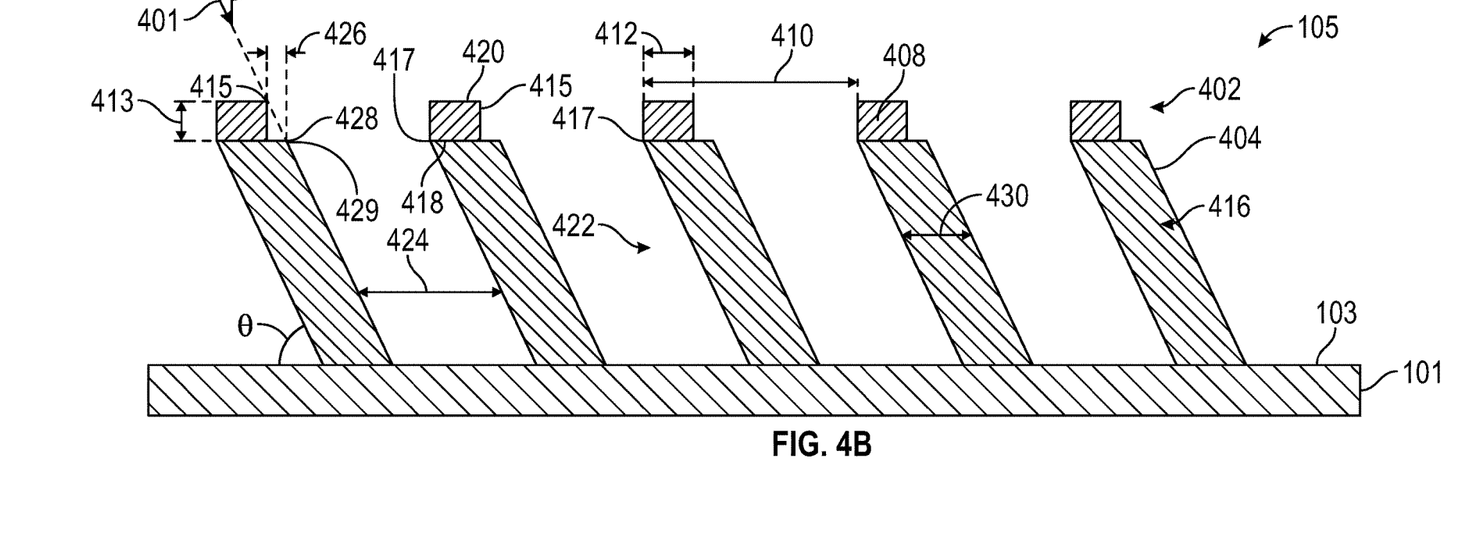

At operation 302, as shown in FIG. 4B, the mandrel material 404 is etched. The mandrel material 404 is exposed to etch beams 401. The etch beams 401 contact the mandrel material 404 at an etch angle ϕ relative to a surface normal 403 of the surface 103 of the substrate 101. The angled etch process is one of ion-beam etching, reactive ion etching, electron beam etching, wet etching, or combinations thereof. The angled etch process accelerates the etch beams 401 to the mandrel material 404. The etch beams 401 have an etch chemistry corresponding to a gas or gas mixture activated to generate the etch beam. The etch beams 401 etch the mandrel material 404 at a higher etch rate than the patterned hardmask 402. The etch beams 401 contact the mandrel material 404 at the etch angle ϕ relative to the surface normal 403 of the surface 103 of the substrate 101. The angled etch process forms a plurality of angled mandrels 416 in the mandrel material 404.

The plurality of angled mandrels 416 are defined by a plurality of cavities 422. Each cavity 422 includes a linewidth 424. The linewidth 424 is controlled by a shadow distance 426 defined as the distance from the leading edge 415 to a first location where the etch beams 401 contact the mandrel material 404. Therefore, as shown in FIG. 4B, the shadow distance 426 is defined from the leading edge 415 to an etch location 429 where a leading sidewall 428 of each angled mandrel 416 is to be formed. The shadow distance 426 corresponds to the linewidth 424 as the etch beams 401 provided at the etch angle ϕ do not contact the mandrel material 404 within the shadow distance 426. Thus, the area defined by the shadow distance 426 and extending down through the mandrel material 404 along the etch angle ϕ forms the leading edge 415 of the plurality of angled mandrels 416. Therefore, the mandrel material 404 disposed below the shadow distance 426 and extending down along the etch angle ϕ will not be etched as the hardmask structure 408 prevents the etch beams 401 from contacting the mandrel material 404 disposed below the shadow distance 426 and extending down along the etch angle ϕ.

Adjusting the hardmask structure critical dimension 412 and/or the etch angle ϕ will change the shadow distance 426 and therefore will change the linewidth 424. The linewidth 424 will affect a critical dimension 202, a spacewidth 204, and a pitch 208 of the plurality of angled optical device structures 102 to be formed (shown in FIGS. 2A-2C). The angled etching process forms the plurality of angled mandrels 416 such that the plurality of angled mandrels have a device angle ϑ relative to the surface 103 of the substrate 101. In one embodiment, which can be combined with other embodiments described herein, the device angle ϑ is substantially the same for each angled mandrel 416. The device angle ϑ substantially corresponds to the etch angle ϕ.

As the mandrel material 404 is chosen to have improved etch performance, the improved selectivity of the mandrel material 404 to the patterned hardmask 402 enables the plurality of cavities 422 to be formed. The patterned pitch 410 is substantially large such that etching lag is reduced when forming the angled mandrels 416. Further, the patterned pitch 410 provides for a decrease in patterning difficulty. The patterned pitch 410 being from 200 nm to about 2000 nm allows for the etching of angled mandrels 416 having a mandrel width 430, which leads to a faster angled etch rate, leading to time savings. The faster etch rate allows for higher effective selectivity between the mandrel material 404 and the patterned hardmask 402, which improves etch performance and etch quality. Additionally, the patterned pitch 410 will allow for a simpler patterning process leading to cost savings. The spacewidth 204 decreases reactive ion etching lag effects.

Figure 4C:
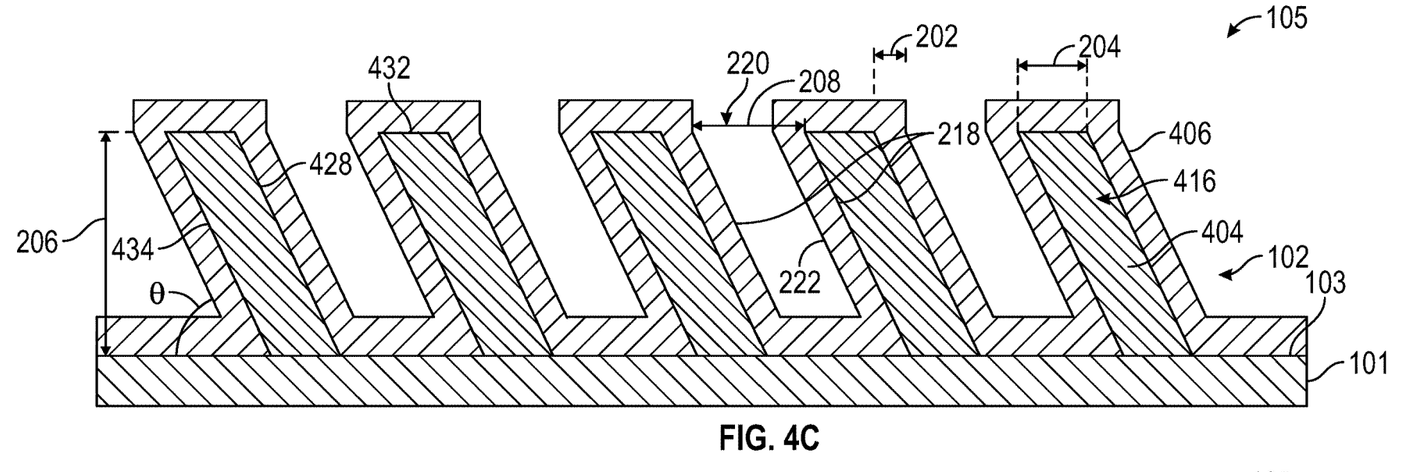

At operation 303, as shown in FIG. 4C, the patterned hardmask 402 is removed and a device material 406 is deposited. The patterned hardmask 402 can be removed by a process that includes, but is not limited to, ion-beam etching, reactive ion etching, electron beam etching, wet etching, or combinations thereof. The device material 406 is deposited on the surface 103 of the substrate 101. The device material 406 is also deposited on the leading sidewall 428, a trailing sidewall 434, and a mandrel upper surface 432 of the plurality of angled mandrels 416. The device material 406 is deposited conformably to the plurality of angled mandrels 416. The device material 406 is deposited by one or more processes such as one or more chemical vapor deposition (CVD), flowable CVD (FCVD), directional physical vapor deposition (PVD), atomic layer deposition (ALD), multi-beam-epitaxy (MBE), ion-beam-assisted-deposition (IBAD), epitaxy, spin-on-glass (SoG) or spin-on-coat (SoC) processes. The device material 406 deposited on the leading sidewall 428 and the trailing sidewall 434 of each of the plurality of angled mandrels 416 includes a critical dimension 202. The critical dimension 202 of the device material 406 disposed on the leading sidewall 428 and the trailing sidewall 434 is substantially the same.

Figure 4D:
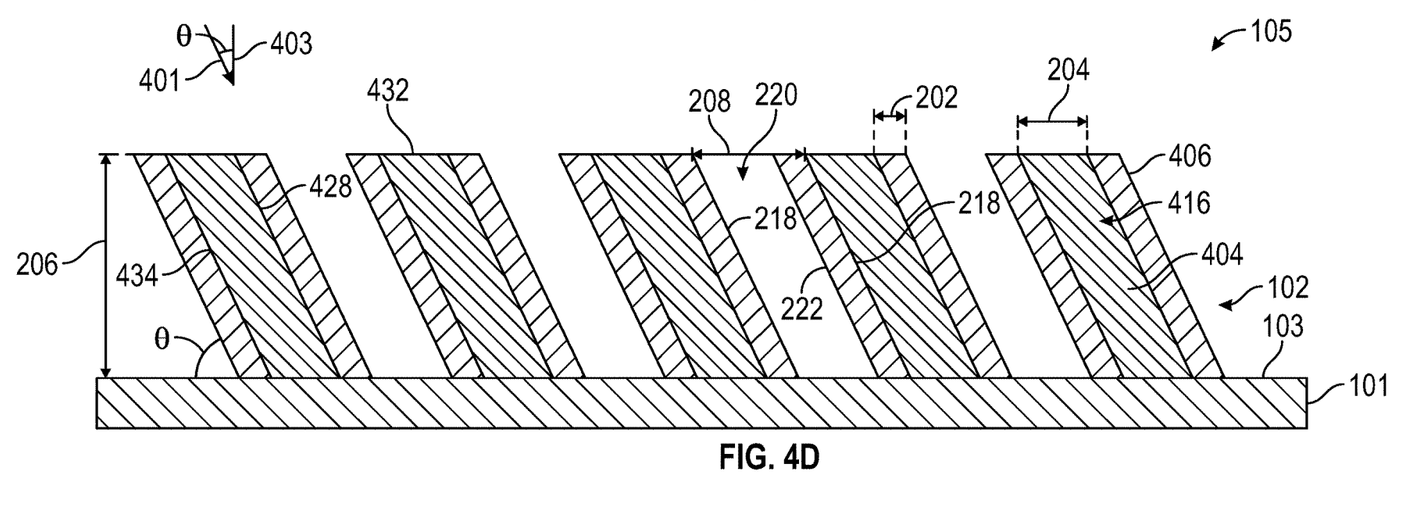

At operation 304, as shown in FIG. 4D, the device material 406 is etched. The device material 406 is exposed to etch beams 401, such as ion beams. The etch beams 401 contact the device material 406 at an etch angle ϕ relative to the surface normal 403 of the surface 103 of the substrate 101. The angled etch process is one of ion-beam etching, reactive ion etching, electron beam etching, wet etching, or combinations thereof. The angled etch process accelerates the etch beams 401 to the device material 406. The etch chemistry may be chosen to allow for only the device material 406 to be removed. The etch beams 401 contact the device material 406 at the etch angle ϕ relative to the surface normal 403 of the surface 103 of the substrate 101. The angled etch process removes the device material 406 disposed on the surface 103 of the substrate 101 and the mandrel upper surface 432 of the plurality of angled mandrels 416. Therefore, only the device material 406 disposed on the leading sidewall 428 and the trailing sidewall 434 remain.

At optional operation 305, the plurality of angled mandrels 416 are etched. The plurality of angled mandrels 416 are etched to form a plurality of angled optical device structures 102, as shown in FIGS. 2A-2C. The plurality of angled optical device structures 102 define a plurality of gaps 220. Each gap of the plurality of gaps 220 is defined between adjacent angled optical device structures 102. The plurality of angled optical device structures 102 are formed from the device material 406 at a device angle ϑ. The etching the angled mandrels 416 is one of ion-beam etching, reactive ion etching, electron beam etching, wet etching, or combinations thereof. The etch selectivity of the etch beams 401 allows the mandrel material 404 to be etched while the device material 406 remains. The etch beams 401 have an etch chemistry corresponding to a gas or gas mixture activated to generate the etch beam 401. The plurality of angled mandrels 416 are etched at the etch angle ϕ.

In some embodiments, the plurality of angled mandrels 416 are not etched entirely from the plurality of gaps 220. For example, the plurality of angled mandrels 416 may remain in the plurality of gaps. For example, when the inclusion of the mandrel material is beneficial to the optical performance of the optical device 100A or 100B to be formed, the mandrel material 404 is not etched.

Each pair of adjacent angled optical device structures 102 of the plurality of angled optical device structures 102 has the spacewidth 204 and the pitch 208 between each adjacent angled optical device structure 102. The spacewidth 204 defines the width of the plurality of gaps 220 disposed between each adjacent angled optical device structure 102. Each of the angled optical device structures 102 has the critical dimension 202. By adjusting the hardmask structure critical dimension 412, shown in FIG. 4A, the plurality of angled mandrels 416 corresponding to the optical device 100A or 100B may be tuned as desired. For example, adjusting the hardmask structure critical dimension 412 will allow for the ability to tune the spacewidth 204, the pitch 208, and the critical dimension 202 of the plurality of angled optical device structures 102. As the spacewidth 204, the pitch 208, and the critical dimension 202 in the optical device 100A or 100B to be formed is known prior the method 300, the hardmask structure critical dimension 412 is calculated to achieve the desired spacewidth 204, the pitch 208, and the critical dimension 202. Additionally, other parameters such as the hardmask thickness 413 or the etch angle ϕ (which will affect the shadow distance 426) can be adjusted to achieve the desired spacewidth 204, the pitch 208, and the critical dimension 202 of the plurality of angled optical device structures 102.

The method 300 described herein allows for the reliable formation of the plurality of angled optical device structures 102 having the critical dimension 202 less than 1 micrometer (μm). The method 300 provides for the number of the plurality of angled optical device structures 102 formed to be double the number of the plurality of angled mandrels 416 formed. For example, as shown in FIGS. 4A-4D, patterning five angled mandrels 416 will allow the formation of ten angled optical device structures 102. In order to reliably form the plurality of angled optical device structures 102 having the critical dimension 202 less than 1 micrometer (μm), forming the plurality of angled mandrels 416 with substantially large mandrel widths 430 is more controllable than directly etching the plurality of angled optical device structures 102. For example, the deposition of the device material 406 having the critical dimension 202 onto the angled mandrels 416 is more reliable and controllable, leading to improved optical device performance. Additionally, forming the angled mandrels 416 with the patterned pitch 410 provides etching benefits such as time savings, cost savings, and etch performance.

In some embodiments, which can be combined with other embodiments described herein, the method 300 may further include depositing gap-fill material 212. As shown in FIG. 2B, a gap-fill material 212 is deposited over the plurality of angled optical device structures 102. In other embodiments, which can be combined with other embodiments described herein, the method 300 may further include depositing a gap-fill material 212. As shown in FIG. 2C, the gap-fill material 212 can be deposited into the plurality of gaps 220 of the plurality of angled optical device structures 102. The gap-fill material 212 may correspond to the mandrel material 404. The gap-fill material 212 may be deposited in one or more of the plurality of gaps 220. The gap-fill material 212 and the gap-fill material 212 may be included to improve the optical performance of the optical device 100A or 100B to be formed. Following the method 300, other suitable processing procedures may be performed on the optical device 100A or 100B.

In summation, methods of forming angled optical device structures are described herein. The methods described herein utilize etching a mandrel material with an etch chemistry that is selective to a patterned hardmask, i.e., the mandrel material is etched at a higher rate than the patterned hardmask. Therefore, angled mandrels are formed in the mandrel material such that device material of the angled optical device structures to be formed is deposited on the plurality of angled mandrels. The device material is etched at an etch angle such that a plurality of angled optical device structures remain. The method described herein allows for the reliable formation of the plurality of angled optical device structures having a critical dimension less than 1 micrometer (μm). To reliably form the plurality of angled optical device structures having the critical dimension 202 less than 1 micrometer (μm), depositing device material having the critical dimension onto the angled mandrels is reliable and controllable. The reliable and controllable formation of the plurality of angled optical device structures leads to improved optical device performance.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   disposing a hardmask layer on a mandrel material, the mandrel material disposed on a substrate;
   patterning the hardmask layer into a plurality of hardmask structures, the hardmask structures defining exposed portions of the mandrel material;
   etching the exposed portions of the mandrel material at a first etch angle to form a plurality of angled mandrels having a device angle, wherein a shadow distance is defined between a leading edge of the hardmask structures and an etch location where a leading sidewall of each angled mandrel is formed;
   removing the hardmask structures;
   depositing a device material on the substrate and on a mandrel upper surface, the leading sidewall, and a trailing sidewall of each of the plurality of angled mandrels; and
   removing the device material disposed on the substrate and the mandrel upper surface of the plurality of angled mandrels with an angled etch process at a second etch angle to form a plurality of angled optical device structures having the device angle.

2. The method of claim 1, further comprising depositing a gap-fill material between at least two adjacent angled optical device structures.

3. The method of claim 2, wherein the gap-fill material contacts an upper surface of the plurality of angled optical device structures.

4. The method of claim 1, wherein cross-sections of the plurality of angled optical device structures include circular, triangular, elliptical, regular polygonal, irregular polygonal, or irregular shaped cross-sections.

5. The method of claim 1, wherein the etching includes ion-beam etching, reactive ion etching, electron beam etching, wet etching, or combinations thereof.

6. The method of claim 1, wherein the device material includes one or more of silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbonnitride (SiCN) containing materials.

7. The method of claim 1, wherein the device material is deposited by one or more of chemical vapor deposition (CVD), flowable CVD (FCVD), physical vapor deposition (PVD), atomic layer deposition (ALD), multi-beam-epitaxy (MBE), ion-beam-assisted-deposition (IBAD), epitaxy, spin-on-glass (SoG) or spin-on-coat (SoC) processes.

8. The method of claim 1, wherein the mandrel material within the shadow distance and extending down through the mandrel material along the first etch angle are protected from etch beams by the hardmask structures such that the leading sidewall of each angled mandrel is formed at the etch location.

9. A method, comprising:
disposing a hardmask layer on a mandrel material, the mandrel material disposed on a substrate;
patterning the hardmask layer into a plurality of hardmask structures, the hardmask structures defining exposed portions of the mandrel material;
etching the exposed portions of the mandrel material at a first etch angle to form a plurality of angled mandrels having a device angle;
removing the hardmask structures;
depositing a device material on the substrate and on a mandrel upper surface, a leading sidewall, and a trailing sidewall of each of the plurality of angled mandrels;
removing the device material disposed on the substrate and the mandrel upper surface of the plurality of angled mandrels with an angled etch process at a second etch angle to form a plurality of angled optical device structures having the device angle; and
removing the plurality of angled mandrels between the plurality of angled optical device structures.

10. The method of claim 9, wherein the etching includes ion-beam etching, reactive ion etching, electron beam etching, wet etching, or combinations thereof.

11. The method of claim 9, further comprising depositing a gap-fill material over the angled optical device structures.

12. The method of claim 9, wherein each angled optical device structure of the plurality of angled optical device structures includes a critical dimension from 10 nm to about 300 nm.

13. The method of claim 9, wherein the forming the plurality of angled optical device structures includes the plurality of angled optical device structures having a pitch from about 100 nm to about 1000 nm.

14. The method of claim 9, wherein a shadow distance is defined between a leading edge of the hardmask structure and an etch location where the leading sidewall of each angled mandrel is to be formed, wherein the mandrel material within the shadow distance and extending down through the mandrel material along the first etch angle are protected from etch beams by the hardmask structures such that the leading sidewall of each angled mandrel is formed at the etch location.

15. A method, comprising:
disposing a hardmask layer on a mandrel material, the mandrel material disposed on a substrate;
patterning the hardmask layer into a plurality of hardmask structures, the hardmask structures defining exposed portions of the mandrel material, the plurality of hardmask structures including:
a patterned pitch between adjacent hardmask structures, wherein the patterned pitch is from about 200 nm to about 2000 nm; and
a hardmask structure critical dimension from about 50 nm to about 500 nm;
etching the exposed portions of the mandrel material to form a plurality of angled mandrels at a device angle, wherein a shadow distance is defined between a leading edge of the hardmask structures and an etch location where a leading sidewall of each angled mandrel is formed;
removing the hardmask structures;
depositing a device material on the substrate and on a mandrel upper surface, the leading sidewall, and a trailing sidewall of each of the plurality of angled mandrels;
removing the device material disposed on the substrate and the mandrel upper surface of the plurality of angled mandrels with an angled etch process at an etch angle to form a plurality of angled optical device structures at the device angle; and
removing the plurality of angled mandrels between the plurality of angled optical device structures.

16. The method of claim 15, further comprising depositing a gap-fill material between at least two adjacent angled optical device structures.

17. The method of claim 16, wherein the forming the plurality of angled optical device structures includes the plurality of angled optical device structures having a pitch from about 100 nm to about 1000 nm.

18. The method of claim 15, wherein the device material is deposited by one or more of chemical vapor deposition (CVD), flowable CVD (FCVD), physical vapor deposition (PVD), atomic layer deposition (ALD), multi-beam-epitaxy (MBE), ion-beam-assisted-deposition (IBAD), epitaxy, spin-on-glass (SoG) or spin-on-coat (SoC) processes.

19. The method of claim 15, wherein the forming the plurality of angled optical device structures includes the plurality of angled optical device structures having a critical dimension from about 10 nm to about 300 nm.

20. The method of claim 15, wherein the forming the plurality of angled optical device structures includes the plurality of angled optical device structures having a spacewidth between about 150 nm and about 1500 nm.

* * * * *